United States Patent [19]
Wollar

[11] Patent Number: 4,726,722
[45] Date of Patent: Feb. 23, 1988

[54] FASTENER FOR SPACED-APART PANELS

[75] Inventor: Burnell J. Wollar, Barrington, Ill.

[73] Assignee: Phillips Plastics Corporation, Chippewa Falls, Wis.

[21] Appl. No.: 18,295

[22] Filed: Feb. 24, 1987

[51] Int. Cl.$^4$ .............................................. F16B 13/06
[52] U.S. Cl. .................... 411/32; 411/508; 411/908; 411/60; 24/297; 174/138 D
[58] Field of Search .................. 411/32, 33, 45, 55, 411/56, 57, 60, 182, 508, 908; 174/138 D; 24/297, 453

[56] References Cited

U.S. PATENT DOCUMENTS

| | | | |
|---|---|---|---|
| 2,936,015 | 5/1960 | Rapata | 411/182 |
| 3,836,704 | 9/1974 | Coules | 174/138 D |
| 3,854,374 | 12/1974 | Boyle et al. | 174/138 D X |
| 3,893,208 | 7/1975 | Yuda | 174/138 D X |
| 4,176,428 | 12/1979 | Kimura | 24/297 X |
| 4,364,427 | 12/1982 | Lefrancois | 411/182 X |
| 4,435,111 | 3/1984 | Mizusawa | 411/21 X |
| 4,478,545 | 10/1984 | Mizusawa et al. | 411/57 |
| 4,579,473 | 4/1986 | Brugger | 24/297 X |
| 4,610,587 | 9/1986 | Wollar et al. | 411/60 |
| 4,674,910 | 6/1987 | Hayashi | 411/508 X |

Primary Examiner—Gary L. Smith
Assistant Examiner—Curtis B. Brueske
Attorney, Agent, or Firm—James E. Nilles; Thomas F. Kirby

[57] ABSTRACT

A two-piece plastic fastener comprising a body and a screw releasably secures a pair of panels together in spaced apart relationship. The body, which has a bore therethrough, comprises a body shank having a body head, outwardly extending, inwardly depressible, flexible locking tabs spaced from the body head, an external shoulder spaced from the tabs, and outwardly expandable walls spaced from the shoulder. The body shank also comprises, inside the bore, flexible screw thread engaging means and ramp means on the inside of the walls. The screw, which is insertable into the bore, comprises a screw head and a screw shank having a threaded portion and an unthreaded end portion. In use, the body shank is inserted into a hole in the first panel so that the latter is entrapped between the body head and the locking tabs. The body shank is then inserted into the hole in the second panel. The screw is axially inserted into the bore so that its threaded portion engages the thread-engaging means in the bore. The screw is then rotatably advanced so that its unthreaded end portion engages the ramps and effects outward expansion of the body walls thereby entrapping the second panel between the shoulder and the expanded walls. With the screw fully inserted, the threaded portion of the screw shank prevents inward depression of the tabs to thereby lock the first panel in place. Axial withdrawal of the screw from the bore causes the expanded walls to retract and enables withdrawal of the body from the hole in the second panel and also allows the tabs to be depressed to enable withdrawal of the body from the first panel.

2 Claims, 11 Drawing Figures

FASTENER FOR SPACED-APART PANELS

BACKGROUND OF THE INVENTION

1. Field of Use

This invention relates generally to a two-piece plastic fastener comprising a body and a screw for releasably securing together a pair of panels in spaced apart relationship.

In particular, it relates to an improved fastener of the aforesaid character.

2. Description of the Prior Art

The prior art discloses a wide variety of plastic fasteners for securing panels together. Some such fasteners comprise a body in the form of a hollow expansion nut and a pin or screw insertable into a bore in the expansion nut to effect nut expansion. In some cases, the nut is inserted into aligned apertures in two or more panels and the pin is inserted into the nut bore to effect nut expansion whereby the panels are entrapped face-to-face between the nut head and an expanded portion of the nut shank. In other cases, the nut is inserted into an aperture in one panel and the screw is inserted into an aperture in the other panel and then into the nut bore to effect nut expansion whereby the said one panel is entrapped between the nut head and expanded nut shank and the said other panel is entrapped between the head of the pin or screw and the nut head. In some cases, the pin or screw is permanently inserted and the panels cannot be detached without destruction of the fastener. In other cases, the fastener components are separable without damage to enable the panels to be detached from one another. Many prior art fasteners are designed for specific applications and their use is limited thereto. Others are more widely usable for a variety of purposes.

U.S. Pat. No. 4,610,587 issued Sept. 9, 1986 and assigned to the same assignee as the present application discloses a prior art fastener comprising a hollow body and a screw which is used to secure two panels together in face-to-face relationship but which does not embody any means to secure the panels in spaced apart fixed relationship.

SUMMARY OF THE PRESENT INVENTION

In accordance with the present invention, there is provided an improved two-piece plastic fastener comprising a hollow body and a screw which is adapted to releasably secure a pair of panels together in confronting, spaced apart relationship. Each panel has an aperture or hole therethrough for receiving the body of the fastener. Generally considered, the body, which has a bore therethrough, comprises a body shank having a body head, outwardly extending, inwardly depressible, flexible locking tabs spaced from the body head, an external shoulder spaced from the tabs, and outwardly expandable walls spaced from the shoulder and joined together at their ends by a flexible member. The body shank also comprises, inside the bore, flexible screw thread engaging means and ramp means on the inside of the walls. The screw, which is insertable into the bore, comprises a screw head and a screw shank comprising a threaded portion and an unthreaded end portion. In use, the body shank is inserted into the hole in one panel until the latter is entrapped between the body head and the locking tabs. The body shank is inserted into the hole in the other panel. The screw is axially inserted into the bore so that its threaded portion engages the thread-engaging means in the bore. The screw is pushed or rotatably advanced so that its unthreaded end portion engages the ramps and effects outward expansion of the body walls thereby entrapping the other panel between the shoulder and the expanded walls. With the screw fully inserted, the threaded portion of the screw shank prevents inward depression of the tabs to thereby lock the first panel in place. Axial withdrawal of the screw by turning causes the expanded walls to retract and enables removal of the body from the other panel and also allows the tabs to be depressed and enables removal of the body from the said one panel.

More specifically, the body, which is fabricated of resilient plastic, has a body head at its head end, a body shank, a bore extending axially through the body head and through the shank, and a flexible end member at its insertion end bridging the bore. The body shank is adapted to be inserted into the hole in the first panel and has outwardly extending inwardly flexible tabs axially spaced from the body head in the direction of the insertion end and cooperating with the body head to define a first space for receiving and entrapping the first panel. The body shank also has an outwardly extending shoulder axially spaced from the tabs in the direction of the insertion end and also has outwardly expandable flexible walls axially spaced from the shoulder in the direction of the insertion end. The portion of the shank between the shoulder and walls is adapted to be inserted into the hole in the second panel. The walls cooperate with the shoulder, and when expanded, define a second space for receiving and entrapping the second panel. The body shank further comprises flexible pin-engaging means in said bore and sloped ramp means on the inside of the flexible walls in the bore. The screw has a screw head at its head end and a screw shank for insertion into the bore in the body. The screw shank comprises ramp-engaging means near the insertion end of the screw shank to effect expansion of the flexible walls. The screw shank further comprises thread means for engaging the flexible pin-engaging means in the bore to prevent unintentional withdrawal of said screw shank from said bore. The screw shank, when fully inserted into the bore, operates to prevent inward flexing of the tabs on the body shank.

A fastener in accordance with the invention offers several important advantages over the prior art. For example, the fastener can be pre-assembled (i.e., with the screw partially inserted into the hollow body) for shipment, storage and during the initial stages of installation into the panel holes, thereby reducing the possibility of loss or misplacement of the two parts and eliminating time wasted in locating and initially assembling the two parts. During installation, the body is latched (but not locked) in the hole in the first panel thereby making it easier to move the first panel and insert the body into the hole in the second panel with risk of the body falling out of the hole in the first panel. Furthermore, after the fastener is fully installed on both panels, it is positively secured thereto and cannot be removed from the second panel unless the screw is intentionally withdrawn and cannot be removed from the first panel until the further step of manually releasing the locking tabs is carried out. The fastener positively locates the two panels in fixed predetermined spaced apart relationship, spacing being a function of fastener size and design. All operational and movable parts and components on each of the body and screw are integrally formed thereon and cannot be lost, displaced or improperly positioned.

Other objects and advantages of the invention will hereinafter appear.

DRAWINGS

DESCRIPTION OF A PREFERRED EMBODIMENT

Figure 1:
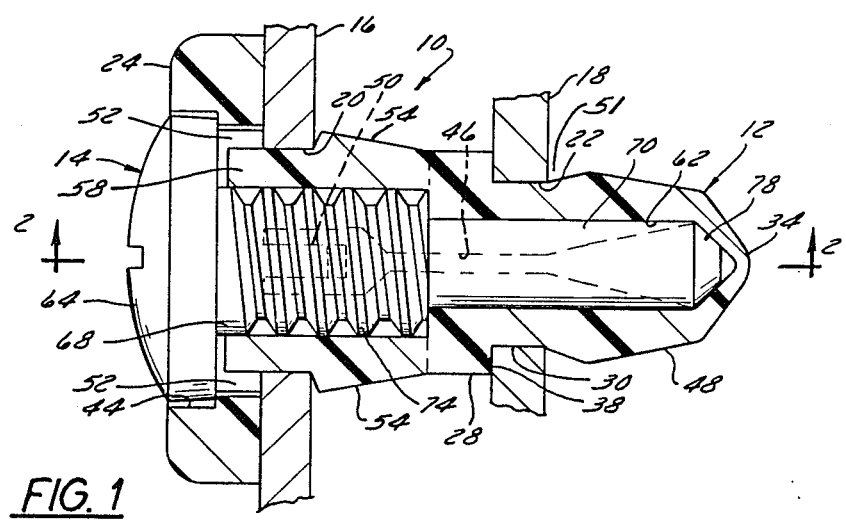
FIG. 1 is a cross-section view of a two-piece fastener according to the invention showing the fastener body fully installed in holes in two panels and releasably securing the panels together in spaced apart relationship and showing the fastener screw fully installed in a bore in the body.

Referring to FIG. 1, there is shown a two-piece reusable plastic fastener 10 in accordance with the invention which comprises a hollow body 12 and a screw 14 and which is employed to releasably secure together two members, such as a first panel 16 and a second panel 18, in confronting spaced apart relationship. Panels 16 and 18 have apertures or holes 20 and 22, respectively, therethrough for accommodating insertion of body 12 thereinto.

Figure 2:
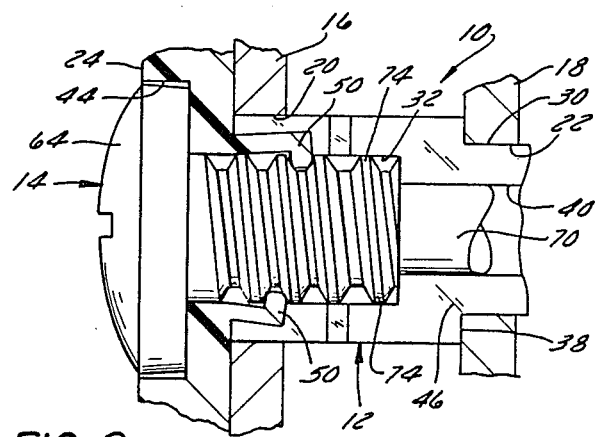
FIG. 2 is a cross-section view taken on line 2—2 of FIG. 1 and showing details of screw-engaging means on the body engaged with the screw.
Figure 4:
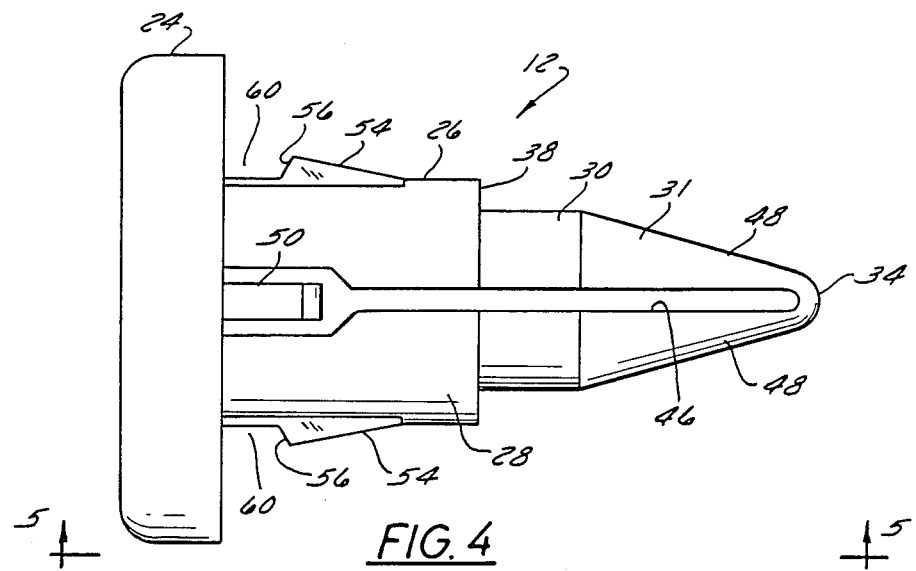
FIG. 4 is a side elevation view of one side of the body.
Figure 5:
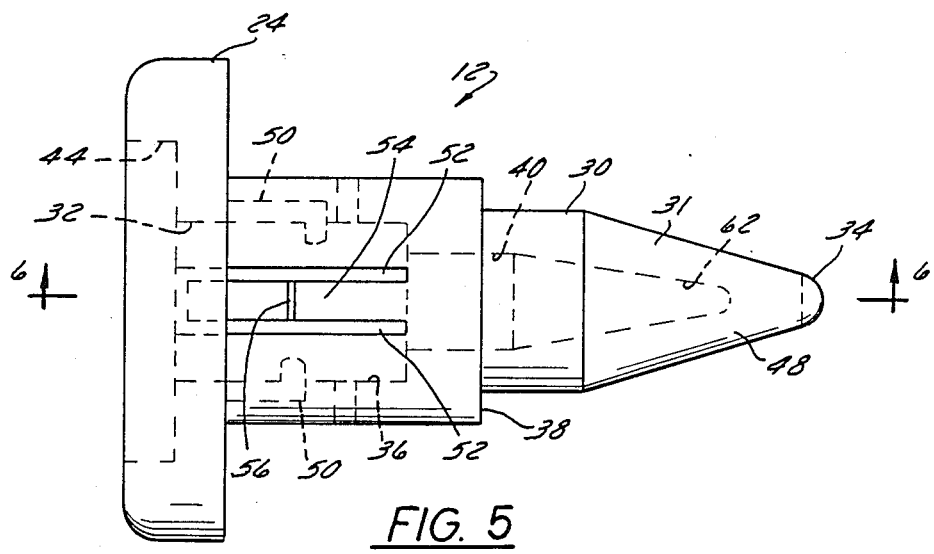
FIG. 5 is a side elevation view of the body, with interior details shown in dashed lines, taken on line 5—5 of FIG. 4.

FIGS. 1 and 2 show fastener 10 in a fully installed condition wherein screw 14 is fully inserted into hollow body 12 and wherein body 12 is in locked engagement with both panels 16 and 18.

Figure 3:
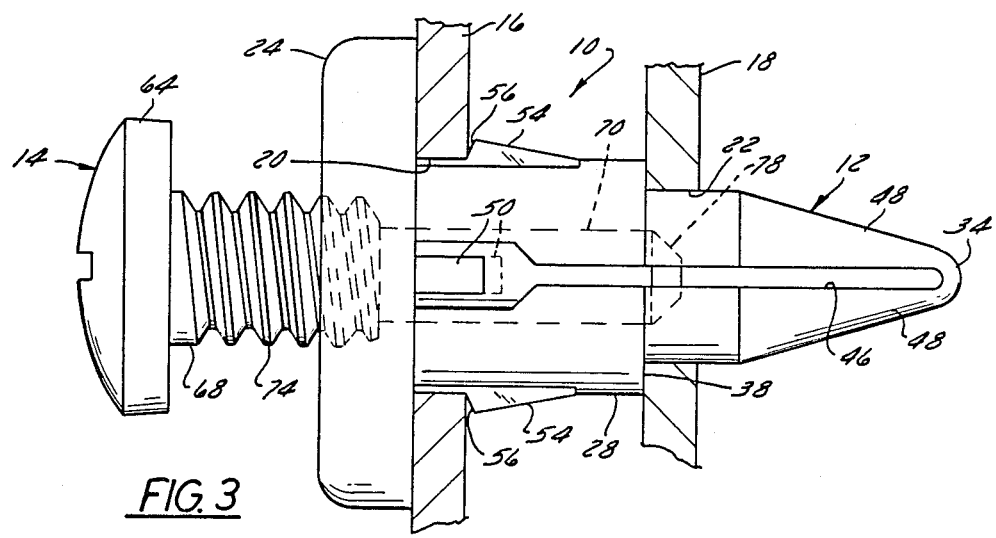
FIG. 3 is a side elevation view of the fastener showing the body installed in the panel holes and showing the screw only partially installed in the body bore.

FIG. 3 shows fastener 10 in partially installed condition wherein screw 14 is only partially inserted in hollow body 12, wherein body 12 is in latched (but not locked) engagement with first panel 16, and wherein body 12 is inserted in hole 22 of second panel 18 but is not yet in locked engagement therewith.

Referring generally to FIGS. 1 through 8, body 12, which is fabricated of flexible resilient plastic such as nylon by the process of injection molding, comprises a head end and an insertion end, which are the left and right ends, respectively, in FIGS. 1 through 6 of the drawings.

Referring generally to FIGS. 1 through 3 and 9 through 11, screw 14, which is also fabricated of flexible resilient plastic such as nylon by the process of injection molding, comprises a head end and an insertion end, which are the left and right ends, respectively, in FIGS. 1, 2, 3 and 9 of the drawings.

Referring to FIGS. 1 through 8, body 12 comprises a body head 24, a body shank 26 having three shank portions 28, 30 and 31, a bore 32 extending axially through the body head and through the body shank, and a flexible end member 34 bridging the insertion end of bore 32 and connected to the insertion end of shank portion 31. Shank portion 28 has a generally cylindrical outer configuration of slightly smaller diameter than that of hole 20 in first panel 16 and that bore portion 36 of bore 32 extending therethrough also has a generally cylindrical configuration. Shank portion 30 has a generally cylindrical outer configuration of smaller diameter than shank portion 28 and cooperates therewith to define a shoulder 38. Shank portion 28 has an outer diameter which is slightly smaller than that of hole 22 in second panel 18. That bore portion 40 of bore 32 extending through shank portion 30 has a generally cylindrical configuration of smaller diameter than bore portion 36. Shank portion 31 has a generally conical outer configuration and that bore portion 42 extending through shank portion 31 has a generally conical configuration. Body head 24 has a recess 44 which communicates with bore 32 and is adapted to receive a screw head.

Figure 6:
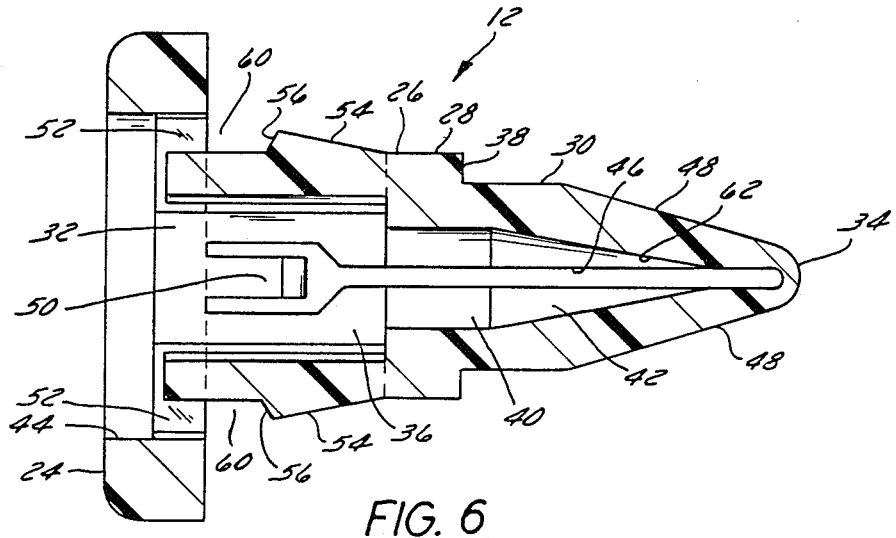
FIG. 6 is a cross-section view of the body taken on line 6—6 of FIG. 5.
Figures 9, 10:
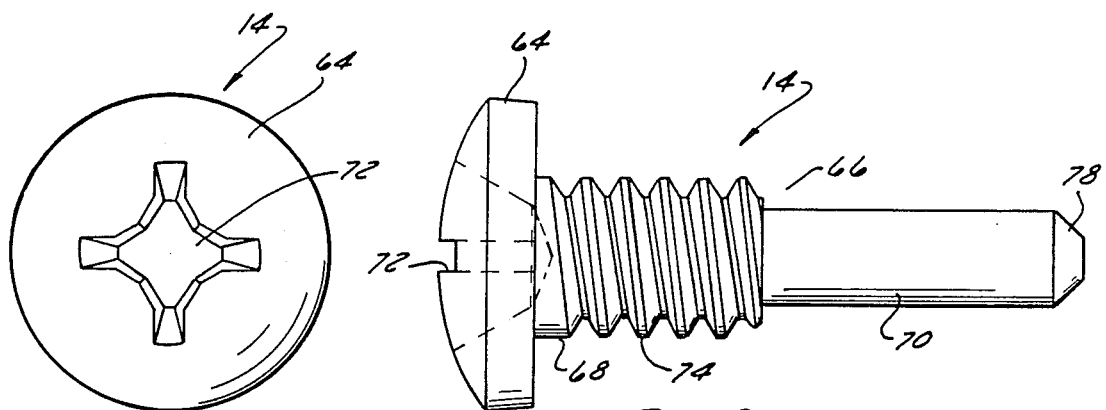
FIG. 9 is a side elevation view of the screw.
FIG. 10 is an elevation view of the head end of the screw of FIG. 9.
Figure 11:
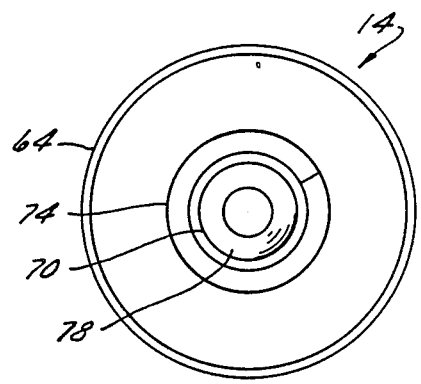
FIG. 11 is an elevation view of the insertion end of the screw of FIG. 9.
Figure 8:
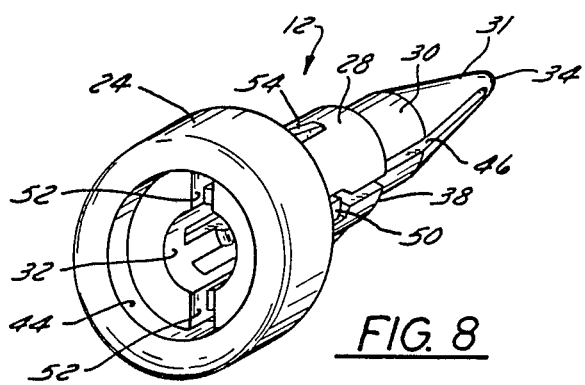
FIG. 8 is a perspective view of the body taken from the head end thereof.
Figure 7:
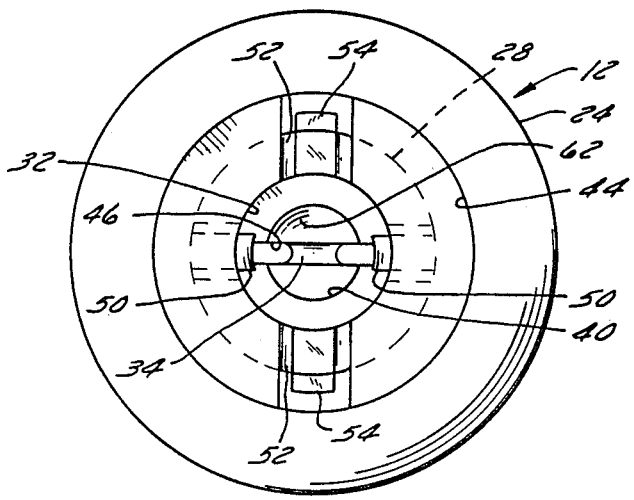
FIG. 7 is an elevation view of the head end of the body.

Body shank 26 is provided on two opposite sides with slots 46 and each slot 46 extends axially between body head 24 and flexible end member 34 and communicates with bore 32. The slots 46 enable opposite sides of conical shank portion 31 to function as outwardly expandable resiliently flexible walls 48. Each slot 46 is widened at its head end to accommodate an outwardly movable resiliently flexible screw thread engaging member 50 which is integrally connected to body head 24. The flexible walls 48 of conical shank portion 31 cooperate with shoulder 38 to define a space 51 (FIG. 1) for accommodating second panel 18. Each flexible wall 48, when disposed in unexpanded condition, as shown in FIG. 6 for example, confronts conical shank portion 31 and its inner side slopes toward the axis of body 12 (proceeding in the direction toward the insertion end of the body) and defines a ramp surface 62.

Body shank portion 28 and body head 24 are provided on two opposite sides with spaces or relieved portions 52 and each space 52 defines and accommodates a resiliently movable locking tab 54 which is integrally connected at one end to body shank portion 28. Each locking tab 54 has a projection 56 which normally extends outwardly beyond the outer surface of shank portion 28. Each locking tab 54 is resiliently depressible inwardly to a position wherein projection 56 is flush with the outer surface of shank portion 28 and wherein the free end 58 (FIG. 1) of the locking tab 54 projects into bore portion 36. Each projection 56 on a locking tab 54 cooperates with the underside of body head 24 to define a space 60 (FIG. 4) for accommodating first panel 16.

As FIGS. 1 through 3 and 9 through 11 show, screw 14 comprises a screw head 64 and a screw shank 66 having two shank portions 68 and 70. Screw head 64 has a recess 72 therein for receiving the tip of a screw driver. Shank portion 68 is provided with a screw thread 74 and the outside diameter of the screw thread is slightly smaller than bore portion 36 of body 12. Shank portion 70 is cylindrical and has an outside diameter the same as the diameter of bore portion 40 of body 12. Shank portion 70 is provided at its insertion end with a tip 78 which has a conical configuration.

Fastener 10 is employed in the following manner to secure the panels 16 and 18 together in fixed spaced apart relationship. Referring to FIG. 3, body 12 is inserted into hole 20 of first panel 16 so that its shank portion 28 enters hole 20. As this occurs, the flexible locking tabs 54 are depressed by the panel moving therepast and the projections 56 thereon become flush with the outer surface of shank portion 28. The free ends 58 of the locking tabs 54 are able to move axially inward into bore portion 36 because that space is not yet occupied by threaded shank portion 68 of screw 14. When first panel 16 is flush with the underside of body head 24 and is located in space 60, the locking tabs 54, being resilient, flex outwardly and back to their initial or normal position and cooperate with body head 24 to maintain first panel 16 in latched (but not yet locked) position in space 60. Referring to FIG. 2, screw 14 is inserted in bore 32 of body 12 and is rotated slightly or pushed so that the insertion end of screw thread 74 engages the two resilient screw thread engaging members 50 extending into bore portion 36 of body 12. At this stage, body 12 and screw 14 are in pre-assembled condition. Referring now to FIGS. 2 and 3, shank portion 30 of body 12 is then inserted into hole 22 of second panel 18 and second panel 16 is abutting shoulder 38 of body 12 but is not yet secured thereto. Screw 14 is then pushed or rotated and screwed inwardly until threaded shank portion 68 of screw 14 is fully inserted into bore portion 36 of body 12 and unthreaded shank portion 70 is fully inserted into initially conical bore portion 42. As such insertion occurs, tip 78 of screw 14 engages the sloped ramp surfaces 62 on the inside of the walls 48 of body 12 and causes the walls to expand outwardly to the positions shown in FIG. 1 and to cooperate with shoulder 38 to define the space 51 in which second panel 18 becomes entrapped and locked between the shoulder and the body head 24. With screw 14 fully inserted, thread 74 of screw shank 66 prevents inward depression of the tabs 54 to thereby lock first panel 16 in place. Axial withdrawal of screw 14 causes the expanded walls 48 to retract and enables removal of body 12 from the second panel 18 and also allows the tabs 54 to be manually depressed to enable removal of body 12 from the first panel 16.

I claim:

1. A two-piece fastener for releasably securing two members together in spaced apart relationship, each member having an aperture therethrough for accommodating said fastener, said fastener comprising:

a resilient plastic body having a body head at its head end, a body shank insertable into the apertures in said members, a bore extending axially through said body head and through said shank, and a flexible end member at its insertion end;

said body shank having outwardly extending inwardly depressible flexible tabs having projections axially spaced from said body head in the direction of said insertion end and said projections cooperating with said body head to define a first space for receiving one of said members each tab having a free end, said flexible tabs, when depressed, extending into said bore;

said body shank further having an external shoulder axially spaced from said tabs in the direction of said insertion end;

said body shank also having outwardly expandable flexible walls axially spaced from said shoulder in the direction of said insertion end and cooperating with said shoulder when expanded to define a second space for receiving the other of said members, said walls being connected to said flexible end members;

said body shank further comprising flexible third-engaging means in said bore and ramp means on said flexible walls in said bore;

said body shank comprising a first body shank portion on which said tabs are located and a second body shank portion on which said flexible walls are located, said second body shank portion being of smaller external diameter than said first body shank portion so that the insertion end of said first body shank portion serves as said shoulder said second body shank portion having a ramp means thereon;

and a screw having a screw head at its head end a screw shank for insertion into said bore of said body, said screw shank comprising ramp engaging means near the insertion end of said screw shank to effect, when inserted into said bore, expansion of said flexible walls, said ramp means being located on said flexible walls being defined by the inner surfaces of said walls, said surfaces being sloped toward the axis of said body in the direction of the insertion end of said body when said walls are in expanded condition;

said screw shank further comprising a screw thread thereon for engaging said thread-engaging means in said bore to prevent unintentional withdrawal of said screw shank from said bore;

said screw shank, when fully inserted into said bore, operating to prevent inward flexing of said tabs on said body shank.

2. A two-piece fastener according to claim 1 wherein said body shank is provided with axially extending slots which define said flexible walls and wherein said flexible thread-engaging means are integrally connected to said body head and extend into said slots.

* * * * *